United States Patent [19]
Bricot et al.

[11] 4,079,247
[45] Mar. 14, 1978

[54] OPTICAL FOCUSSING DEVICE

[76] Inventors: Claude Bricot; Jean-Claude Lehureau, both of 173, bld Haussmann, Paris 75008, France

[21] Appl. No.: 684,355

[22] Filed: May 7, 1976

Related U.S. Application Data

[63] Continuation-in-part of Ser. No. 540,943, Jan. 14, 1975, abandoned.

[30] Foreign Application Priority Data

May 16, 1975 France .................... 75 15433

[51] Int. Cl.² .................................. G01J 1/20
[52] U.S. Cl. ........................... 250/201; 250/204
[58] Field of Search .............. 250/201, 204, 209; 354/25, 163; 356/1, 4, 5

[56] References Cited

U.S. PATENT DOCUMENTS

| 3,482,102 | 12/1969 | Thomas | 250/204 |
| 3,520,625 | 7/1970 | Gillieron et al. | 250/201 |
| 3,719,421 | 3/1973 | Poilleux et al. | 356/4 |

Primary Examiner—David C. Nelms
Attorney, Agent, or Firm—Cushman, Darby & Cushman

[57] ABSTRACT

A device for focussing a read-out light beam on a moving data carrier. It comprises an objective lens which causes said read-out beam to converge on the data carrier; a cylindrical lens arranged in the path of a light beam reflected by the data carrier; and photo-electric means for detecting the reflected beam and arranged in such a fashion that the light spot obtained there, normally substantially circular in shape, is distorted by elongation if focussing of the read-out beam on the data carrier is incorrect.

2 Claims, 4 Drawing Figures

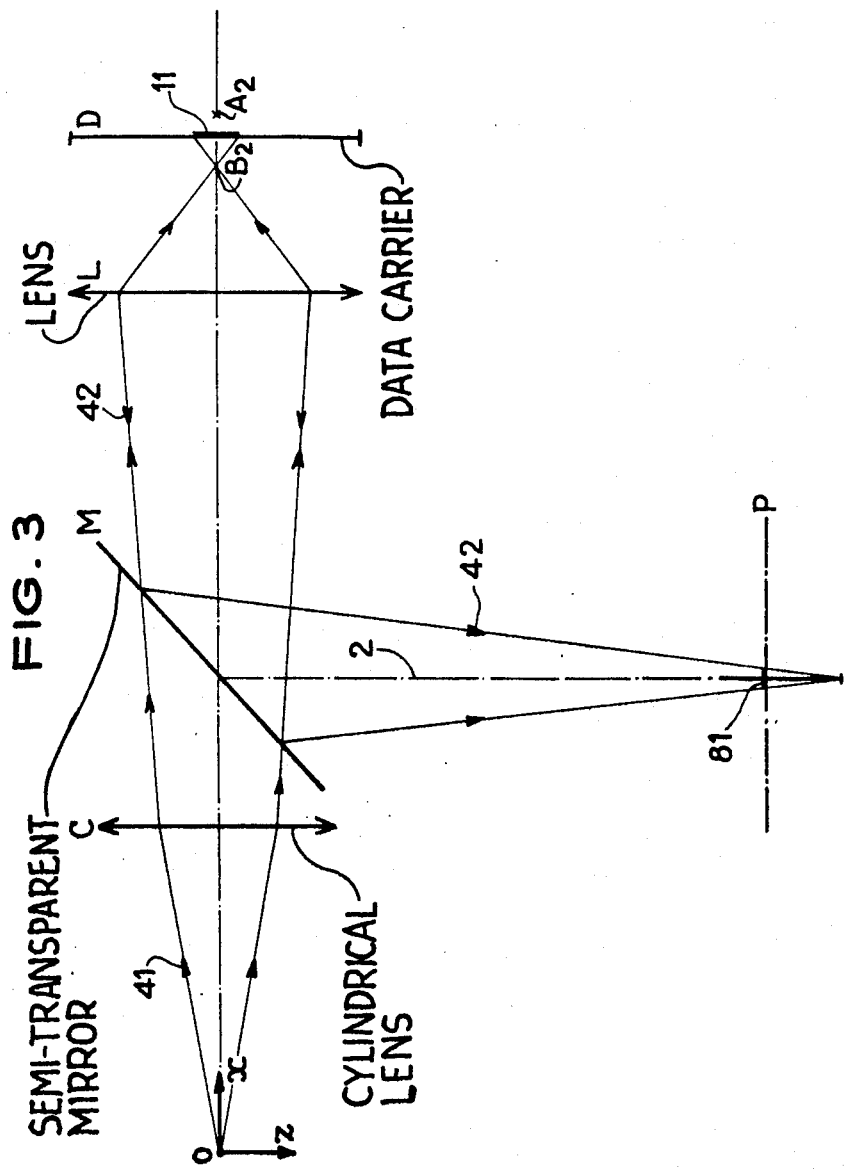

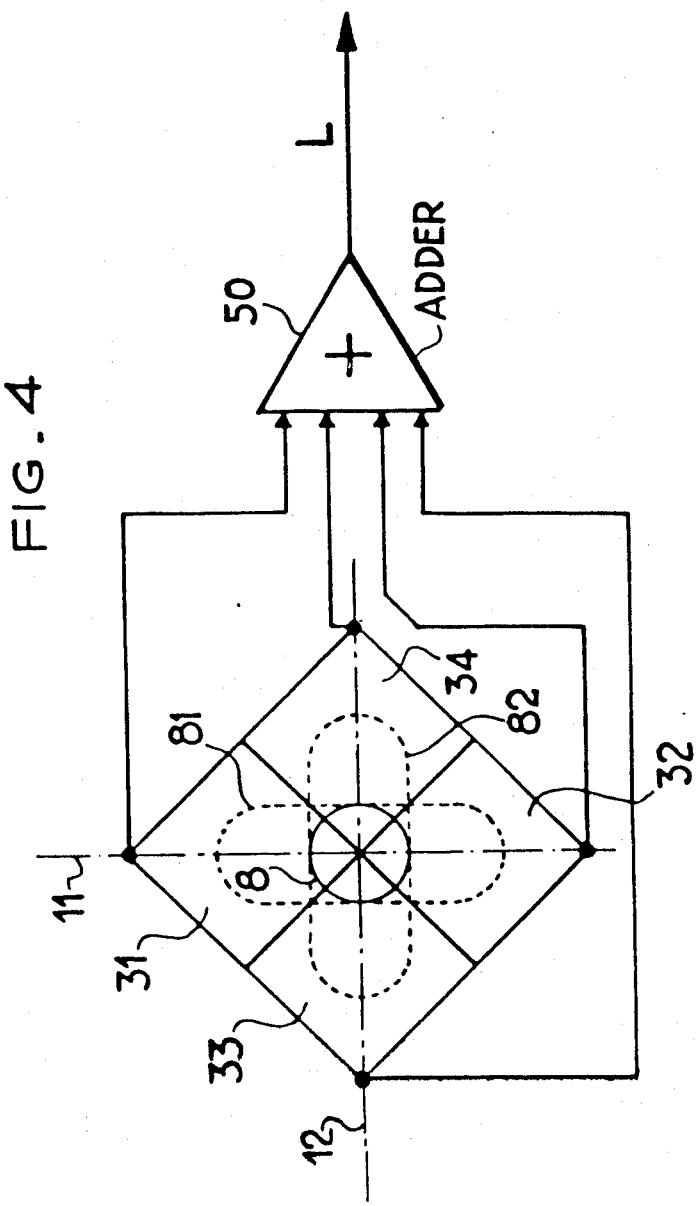

OPTICAL FOCUSSING DEVICE

This is a continuation-in-part of application Ser. No. 540,943, filed Jan. 14, 1975, now abandoned. Application Ser. No. 727,803 filed Sept. 29, 1976 is a continuation of application Ser. No. 540,943.

The present invention relates to the field of the optical read-out of information recorded upon a moving data carrier such as a disc or tape. It relates more particularly to a device for focussing the read-out light beam on to the data carrier.

The optical read-out of data recorded in high-density fashion, presents a difficult technological problem of accuracy and various systems have hitherto been proposed intended in particular to ensure relative positioning of the data carrier and the reader in the plane of the read-out beam, perpendicularly to the data carrier.

It is possible, for example, to utilise that part of the read-out beam which is reflected by the data carrier, and a mask, suitably arranged in order to stop part of said beam, in association with a photo-electric detector device which furnishes an error signal when the point of convergence of the read-out beam is no longer located upon the data carrier, this a consequence of a random displacement on the part of the latter. The major drawback of this kind of system is that it is highly sensitive to defects of the data carrier; in other words, stability of the light spot produced upon a detector by the reflected beam, is then essential in order to produce a correct error signal.

Other solutions consist in utilising, too, that part of the read-out beam which is reflected by the data carrier but, in order to avoid the aforementioned defect, the reflected beam is processed by an optical system completely independent of the system responsible for the read-out function, and this of course if a cumbersome solution.

The object of the present invention is a focussing device which makes it possible to overcome the aforementioned drawbacks by the utilisation of an optical imaging device which comprises at least one lens having meridian differences of curvature for causing light incident normally to focus to two focal lines at right angle.

For a better understanding of the invention and to show the same may be carried into effect, reference will be made to the following description and the attached drawings in which:

FIG. 3 is the diagram of a variant embodiment of the invention;

FIG. 4 is a diagram illustrating another variant embodiment of the invention.

In these various figures, similar references designate similar elements.

Figure 1:
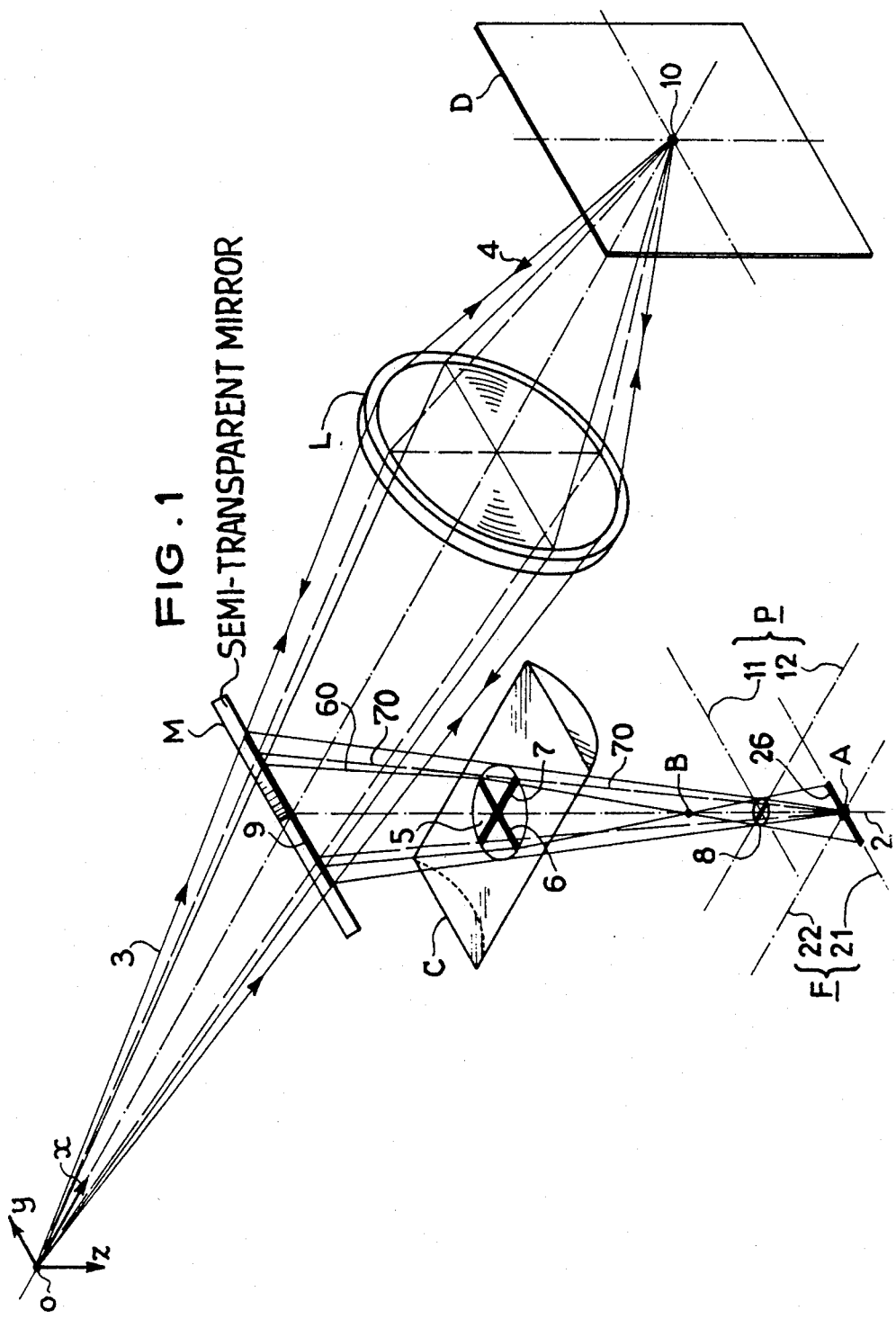
FIG. 1 illustrates an embodiment of the device in accordance with the invention.

In FIG. 1 there can be seen: a source O of radiant energy, emitting a beam 3 along the axis Ox of a reference system Oxyz of orthogonal co-ordinates; means M for splitting the light energy, such for example as a semi-transparent mirror not normal to the axis Ox but making an angle of 45° with the latter for example; an objective lens L of optical axis Ox causing the beam 3 to converge at a convergence point 10 on a data carrier D normal to the axis Ox, where a recorded piece of information modulates the light beam 3. The modulated optical signal thus obtained ultimately makes it possible to reconstitute recorded data in accordance with a conventional process which will not be described here.

At least a fraction of the beam 3 is reflected by the reflective surface of the data carrier D; this reflected beam, marked 4, passes through the objective lens L and is then deflected by the semi-transparent mirror M in order to converge at a point A, symmetrical with the source O in relation to the mirror M and located upon an axis 2 parallel to Oz. Through the point A there passes a plane normal to the axis 2, marked F and illustrated by two orthogonal axes 21 and 22 respectively parallel to Oy and Ox.

On the axis 2, there is interposed an optical device C arranged in the path of the reflected beam 4 which makes it possible to render the optical system astigmatic in character for normally incident light. A device of this kind can be formed with the help of a cylindrical lens, the axis of the cylinder being for example chosen parallel to the axis Ox. As those skilled in the art will understand, the cylindrical lens C has the effect of relating to the point source O a straight line segment 26 extending to other side of the point A in the plane F and parallel to the axis Oy in the example shown in the figure.

For reasons of clarity, the drawing shows:

the spots 9 and 5 which are substantially circular, traced by the beam 4 on the mirror M and on the cylindrical lens C;

the diameters 6 and 7 of the light spot 5, respectively parallel to the axes Oy and Ox;

the light rays 60 and 70 passing through the extremities of the diameters 6 and 7, respectively; the rays 60 define the segment 26 after convergence at a point B on the axis 2; the rays 70 converge at the point A, and define the segment 126. Segments 26 and 126 are the two focal lines at right angle produced by the optical combination which comprises the anastigmatic objective lens L and the associated cylindrical lens C.

A plane P referred to as the observation plane, is represented in the figure by two orthogonal axes 11 and 12, respectively parallel to Oy and Ox; the plane P is chosen as being located on the axis 2 between the points A and B, where the area of the light spot (8) is minimum (circle of least confusion).

The foregoing description applies to the case in which the beam 3 is correctly focussed upon the data carrier D at the point of convergence 10.

If the contrary is the case, and this has not been illustrated simply in order not to overburden the drawing, consequent upon the random displacement of the data carrier D, then it would be formed in the plane P a light spot distorted in relation to the spot 8, by extension along the axis 11 or the axis 12, depending upon whether the beam 3 converges before or after the data carrier D.

In the observation plane P, means for detecting the shape of the light spot are arranged. These means are being for example formed with the help of photo-electric cells in the manner shown in FIG. 2, and furnish a focussing control signal. The detection means, in this embodiment, comprise four photo-electric cells 31, 32, 33 and 34 arranged in a square whose diagonals are constituted by the axes 11 and 12 and disposed in such a fashion that the light spot 8 referred to earlier, is formed substantially at the center of the square.

The cells belonging to one and the same diagonal are connected to an adder, that is to say, in the figure, the cells 31 and 32 (on the axis 11) to an adder 35, and the cells 33 and 34 (on the axis 12) to an adder 36. The adders are connected to a differential amplifier 37:

the adder 35 is connected to the positive input of the amplifier 37 and the adder 36 to the negative input. At the output of the amplifier 37 there is available an electrical signal S which constitutes the focussing control signal. This signal is utilised in two ways, for example: on the one hand it is directed towards a monitoring element 38, for example a display, on the other hand the signal S is directed to a motor 39 which makes it possible to modify the position of the objective lens L (arrows 4) along its optical axis (not shown) as a function of the signal S, thus creating a feed back system of focussing the beam 3 on the data carrier D.

The three shapes of light spots which are likely to form in the observation plane P, have been shown, namely the spot 8 of minimum area referred to earlier, a spot 81 elongated along the axis 11, and a spot 82 elongated along the axis 12.

It is clear that, in view of the method of connection of the photo-electric cells described earlier, the signal S will be zero if focussing is correct (spot 8 substantially circular), positive if the data carrier D has moved away from the objective lens L (spot 81) and negative if the data carrier D has moved towards the objective lens L (spot 82).

This control signal S thus makes it possible to determine the position of the disc at any instant during the read-out of the data carrier D, this with the help of a circuit which is extremely simple in design.

FIG. 3 schematically illustrates a variant embodiment of part of the focussing device in accordance with the invention, in which variant embodiment the cylindrical lens C is located between the source O and the semi-transparent mirror M. By way of example, the diagram has been produced in the plane xOz and the axis of the cylinder C is in the perpendicular plane, parallel to the axis Oy.

In the plane xOz, the divergence of the light beam 41 emitted by the source O, is reduced after the lens C; as the beam 3 did before, the beam 41 passes successively through the semi-transparent mirror M and the focussing objective lens L to converge at a point $B_2$ on the axis Ox. The reference $A_2$ has been used to indicate the focal point of the light rays in the plane xOy (not shown). The data carrier D is arranged, between $A_2$ and $B_2$, where the light spot (11) has its minimum size (circle of least confusion).

As before, the data carrier D reflects at least part of the read-out light beam 41 towards the objective lens L and the mirror M. The reflected beam 42, of axis 2, thus rendered convergent, is observed in a plane P located normally to the axis 2, where the light spot (81) is of minimum size, as in the previous embodiment.

Figure 2:
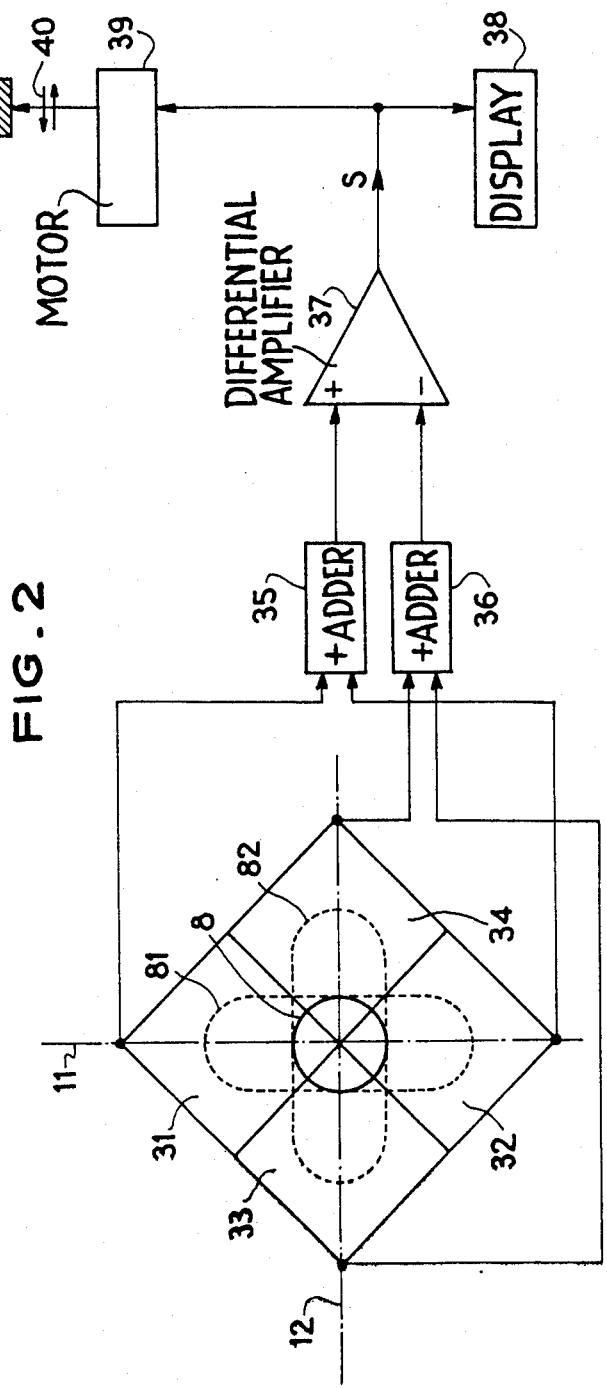
FIG. 2 is the diagram of an embodiment of photo-detection means belonging to the device in accordance with the invention.

If, as a consequence of displacement of the data carrier D, the focussing of the read-out light beam 41 is incorrect, the light spot will be distored in accordance with two orthogonal axes, and these distortions are detected for example by means of the four photo-electric cells described in FIG. 2.

By way of example, if we assume that the fluctuations in position on the part of the data carrier D are limited to $dx = 10$ microns along the axis Ox and if a read-out objective lens L of focal length $f = 3$ mm is used, then the power of the lens C should be $D = (dx/f^2) \simeq 1$ diopter. Such a low power as this makes it possible to utilise the embodiment described in FIG. 3: this does not, in other words, substantially affect read-out.

The focussing device in accordance with the invention is applicable to any operation of read-out of information carried by a moving track. However, it is more particularly suitable for the read-out of high density information, as for example television signals.

It should be noted that when the point 10 of convergence of the beam 3 on the data carrier D is situated on a diffracting element, the light undergoes very significant diffraction on account of the dimensions selected for the elements in question. Accordingly, only a fraction of the incident light intensity constitutes the return beam 4, and, the only effect produced at the level of the plane P is to reduce the light intensity of the spot observed without causing its proportions to vary appreciably, whether or not focusing is correct.

FIG. 4 shows the use of this device for producing an electrical reading signal representing the information recorded on the data carrier D.

As shown in FIG. 4, the embodiment of the detection means placed in the plane P, comprises four photosensitive cells 31, 32, 33 and 34 arranged in the same way as in FIG. 2, i.e. in such a way that they form a square of which the diagonals are formed by the axes 11 and 12 so that the light spot of minimal proportions mentioned above (referenced 8) is formed substantially at the centre of the square.

The electrical signals provided by the cells are treated in such a way that they supply an electrical signal S indicating the deformation, if any, of the light spot along the axis 11 (contour 81) or the axis 12 (contour 82).

In FIG. 4, the four cells are connected to an adder 50 which supplies a signal L equal to the sum of the signals produced by each of the cells.

When the convergence point 10 of the beam 3 does not encounter a diffracting element, the light spot received by the photodetector cells has an intensity of the highest level. When the point 10 encounters a diffracting element, the light spot received by the cells is of substantially lower intensity. The result of this is a variation as a function of time in the sum L(t) of the signals delivered by the detection cells. The signal L appears as a crenellated signal which translates the spatial variations of the signal recorded on the support D.

A device such as this is particularly suitable for optically reading information recorded at a high density, for example television signals.

What we claim is:

1. A device for focussing a read-out light beam onto the reflective surface of a moving data carrier, said device comprising an objective lens which causes the read-out beam to converge upon said reflective surface, optical guidance means for guiding, towards an observation plane, a reflected beam consisting of at least one fraction of said read-out beam reflected by said reflective surface; optical means arranged in the path of one of said beams for introducing astigmatism on the optical axis of said objective lens; said reflective surface and said observation plane being located respectively in first and second imaging planes; said beams respectively projecting first and second light spots in said first and second imaging planes; four adjacent photoelectric cells being positioned in said observation plane for detecting the shape of the second of said light spots; electrical means processing the electrical signals furnished by said photoelectric cells for producing a control signal, controlling the focussing of said read-out beam; said electrical means comprising an adder having four inputs respectively supplied from the respective outputs of said photoelectric cells; the output signal of said adder being representative of the information recorded on to said data carrier.

2. A device as claimed in claim 1, wherein said photoelectric cells are arranged in said observation plane on either side of two crossed lines of separation; the bissectrices of said lines of separation being substantially parallel to the lines at right angle projected by said reflected beam axes of distortion by extension of said light spot under the effect of a focussing error; said electrical means furnishing a value of said control signal depending upon said focussing error.

* * * * *